Figure 1:
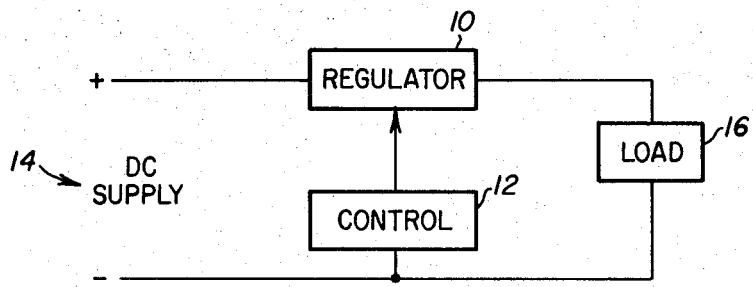

United States Patent
Heidt

[15] 3,703,679
[45] Nov. 21, 1972

[54] CURRENT REGULATOR WITH DELAYED TURN-OFF

[72] Inventor: Marvin W. Heidt, Marion, Iowa
[73] Assignee: Collins Radio Company, Dallas, Tex.
[22] Filed: Oct. 28, 1971
[21] Appl. No.: 193,296

[52] U.S. Cl..............323/9, 317/33 VR, 317/36 TD, 317/54, 323/22 T
[51] Int. Cl...............................................G05f 1/58
[58] Field of Search....317/33 VR, 36 TD, 54; 323/4, 323/9, 22 T, 38

[56] References Cited
UNITED STATES PATENTS 3,538,426  11/1970  Jones............................323/9
3,125,715  3/1964  Brooks..................317/33 VR
3,102,225  8/1963  Kenny et al..........317/33 VR Primary Examiner—A. D. Pellinen
Attorney—Henry K. Woodward et al.

[57] ABSTRACT

A voltage regulator with delayed current turn-off characteristics particularly useful with capacitive loads and including a load current control transistor, control circuitry for the current control transistor, and load current sensing circuitry the control circuitry being responsive to excess load current and biasing the load current control transistor to limit current. Transistor circuitry is provided within the control circuitry whereby continued excess current for a predetermined period of time will remove the power supply by interrupting the current to the load.

5 Claims, 2 Drawing Figures

PATENTED NOV 21 1972 3,703,679

CURRENT REGULATOR WITH DELAYED TURN-OFF

This invention relates generally to electrical power supply regulators, and more particularly to a power supply regulator with delayed turn-off characteristics.

Power supply protection circuits using fuses for overload current interruption are generally too slow acting to prevent damage to semiconductor devices in the circuit load or in the power supply. Constant voltage regulators utilizing series current pass transistors with current limiting above a limit value tend to overdissipate the series pass transistors of the regulator. Further, a supply with an immediate turn-off circuit responsive to load current will not start a capacitive load. Moreover, if the supply turnoff is delayed to start a capacitive load it might cause damage if an overcurrent condition exists in an associated semiconductor circuit.

An object of the present invention is an improved power supply regulator with current limiting capability and with delayed turn-off characteristics.

Features of the invention include a series transistor means for regulating the current from a power supply to a load. Control means is provided which senses an overload condition and biases the transistor means whereby current flow to the load is limited. Means is provided within the control means whereby continued excess current for a predetermined period of time will remove the power supply by interrupting the current to the load.

Figure 2:
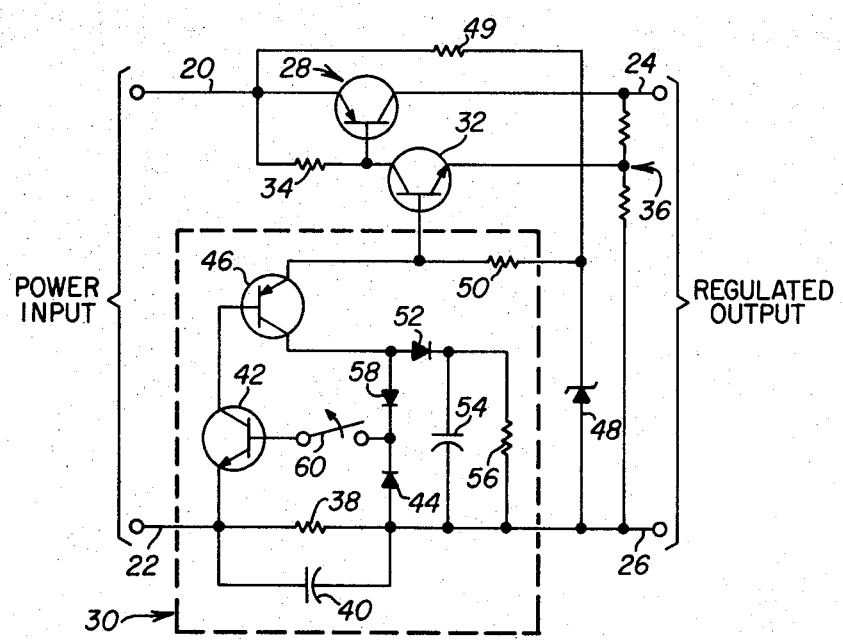

These and other objects and features of the invention will be more fully understood from the following detailed description and appended claims when taken with the drawing, in which:

FIG. 1 is a block diagram of the regulator in accordance with the present invention; and FIG. 2 is a schematic of a preferred embodiment of the regulator in accordance with the present invention.

Referring now to the drawing, the present invention encompasses a regulator 10 and associated control means 12 for regulating the current from a dc supply 14 to a load 16. Importantly, the regulator 10 comprising a transistor or like current regulating device is responsive to the control means 12 whereby load current is limited when the control means senses a current exceeding a predetermined level. If the load current returns to a normal or acceptable level within a predetermined time, that dc supply again functions as a constant voltage source. However, if the overcurrent condition remains after the predetermined period of time the regulator interrupts the current path to the load or otherwise effectively reduces the load current until the overload condition is remedied and the regulator is reset. Thus, capacitive loads which may pull a larger current when starting, for example, will function normally in combination with the regulator so long as the running current assumes a normal level within the predetermined time.

Referring to FIG. 2, a schematic of a preferred embodiment of the regulator in accordance with the present invention is illustrated. A dc power supply is connected across terminals 20 and 22 with positive polarity at terminal 20, and the regulated output to the load is taken at terminals 24 and 26. Connected serially between terminals 20 and 24 is a current regulating transistor 28 which controls load current in response to the control means shown generally at 30.

Controlling the base bias of transistor 28 is a transistor 32 having its collector connected to the base of transistor 28 and through resistor 34 to input terminal 20. The emitter of transistor 32 is connected to voltage divider 36 connected across output terminals 24 and 26. Which provides a first reference voltage. The base is connected through resistor 50 to a reference voltage zener diode 48 which is serially connected with resistor 49 between terminals 20 and 26 and provides a second reference voltage.

In normal operation, transistor 32 is conducting and the resulting bias on the base of transistor 28 through resistor 34 renders transistor 28 conductive, whereby load current flows uninhibited from terminal 20 to terminal 24. Control means 30 is designed to sense an overcurrent situation whereby transistor 28 is biased to provide current limiting for the power supply. Connected between terminal 22 and terminal 26 is a parallel circuit comprising resistor 38 and capacitor 40 which provide the current sensing function. Capacitor 40 prevents the regulator from reacting to sensed transient effects such as noise and the like in the load circuit.

When the load current increases above a normal level the voltage drop across resistor 38 is sufficient to forward bias the base-emitter junction of transistor 42, through diode 44, thereby rendering transistor 42 conducting. The resulting bias on the base of transistor 46 renders transistor 46 conductive. Current flowing through transistor 46, via serially connected zener diode 48 and resistor 50, creates a voltage drop across resistor 50 and reduces the reference voltage on the base of transistor 32. The reduced base bias on transistor 32 decreases the conductivity of transistor 32, thereby increasing the positive bias on the base of transistor 28. Transistor 28 is PNP type, and the increased positive bias on the base of transistor 28 reduces the conductivity of transistor 28 thereby tending to limit load current. However, this limiting of the load current does not hinder the operation of a capacitive load, such as a capacitive starting motor.

With transistor 46 becoming conductive, current flows from the collector of transistor 46 through diode 52 and capacitor 54 thereby charging capacitor 54. The charging rate of capacitor 54 is limited by resistor 56 connected in parallel with capacitor 54. If the overload condition continues for sufficient time to build the requisite charge across capacitor 54, the increased base current provided to transistor 42 drives transistor 42 into saturation. Consequently, the bias on the base of transistor 32 renders transistor 32 nonconductive, thereby increasing the positive bias on the base of transistor 28. Transistor 28 then is rendered nonconductive or only slightly conductive and load current is effectively removed from the load, thereby minimizing possible damage to semiconductive elements of the load and of the regulator.

Once the overload condition is remedied, the regulator is reset by opening switch 60 thereby removing the bias from the base of transistor 42 or by momentarily removing the dc supply voltage 14, and the regulator again assumes its normal load state with the conducting bias again applied to the base of transistor 28. The charge across capacitor 54 is dissipated through resistor 56.

In one specific embodiment of the invention for regulating a 12 volt dc source the regulator has the following component values: ps

| | |
|---|---|
| Transistor 28 | 2N3741 |
| Transistor 32 | 2N2219A |
| Transistor 46 | 2N2907A |
| Transistor 42 | 2N2222A |
| Zener Diode 48 | 1N754 |
| Diode 52 | 1N270 |
| Diode 58 | 1N270 |
| Diode 44 | 1N645 |
| Resistor 50 | 10K |
| Resistor 34 | 680 |
| Resistor 38 | 0.3 |
| Resistor 56 | 10K |
| Capacitor 54 | 200μf |
| Capacitor 40 | 0 |

The described regulator has proved very successful in operation with capacitive loads where delayed load current turnoff is mandatory. While the invention has been described with reference to a specific embodiment, the description is illustrative and not to be construed as limiting the invention. Various modifications and changes may occur to those skilled in the art without departing from the spirit and scope of the invention as defined by the appended claims.

I claim:

1. A current regulator with delayed cut-off characteristics comprising transistor current control means for serially connecting with a load, first means for forward biasing said current control means for normal load currents, second means for reducing said forward bias when load current exceeds a preselected value, said second means including a first transistor connected between said current control means and a first reference voltage means, second reference voltage means serially connected through resistive means to the base terminal of said first transistor, second and third transistors, said second transistor connected between said base terminal of said first transistor and a voltage charging circuit, said third transistor connected between the control terminal of said second transistor and a regulator input terminal, current sensing means for serially connecting with said load, means connecting said current sensing means to the control terminal of said third transistor whereby an excess current renders said third transistor conductive, the conductivity of said third transistor rendering said second transistor conductive and charging said voltage charging means, and means connecting said voltage charging means and the control terminal of said third transistor whereby said third transistor is driven into saturation when accumulated charge on said voltage charging means provides saturation bias thereto.

2. A current regulator as defined by claim 1 wherein said first means for forward biasing comprises resistive means connecting the control terminal of said transistor current control means with a regulator input terminal.

3. A current regulator as defined by claim 1 wherein said first reference voltage means comprises a voltage divider connected across the output terminal of said regulator and said second reference voltage means comprises zener diode means connected between a regulator input terminal and a regulator output terminal.

4. A current regulator as defined by claim 1 wherein said voltage charging circuit comprises a charging capacitor and a charge dissipating resistor connected in parallel.

5. A current regulator as defined by claim 1 wherein said current sensing means comprises a resistor.

* * * * *